(12) United States Patent
Smith

(10) Patent No.: US 11,032,138 B2
(45) Date of Patent: Jun. 8, 2021

(54) MANAGING TRAFFIC CONTROL IN A NETWORK MITIGATING DDOS

(71) Applicant: LEVEL 3 COMMUNICATIONS, LLC, Broomfield, CO (US)

(72) Inventor: Robert Smith, Irvine, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 529 days.

(21) Appl. No.: 14/920,465

(22) Filed: Oct. 22, 2015

(65) Prior Publication Data
US 2016/0119187 A1 Apr. 28, 2016

Related U.S. Application Data

(60) Provisional application No. 62/067,356, filed on Oct. 22, 2014.

(51) Int. Cl.
*H04L 12/24* (2006.01)
*H04L 12/801* (2013.01)
*H04L 12/771* (2013.01)
*H04L 12/715* (2013.01)

(52) U.S. Cl.
CPC .......... *H04L 41/0813* (2013.01); *H04L 41/20* (2013.01); *H04L 41/22* (2013.01); *H04L 45/56* (2013.01); *H04L 47/12* (2013.01); *H04L 45/04* (2013.01)

(58) Field of Classification Search
CPC ....... H04L 41/235; H04L 41/20; H04L 41/22; H04L 41/56; H04L 41/12; H04L 41/04; H04L 41/00; H04L 47/10; H04W 28/02

USPC ......................................................... 370/235
See application file for complete search history.

(56) References Cited

U.S. PATENT DOCUMENTS

| | | | | |
|---|---|---|---|---|
| 7,016,980 B1* | 3/2006 | Mayer | ................ | H04L 41/0853 709/248 |
| 8,284,758 B2* | 10/2012 | Shah | ...................... | H04L 45/02 370/230 |
| 8,510,826 B1* | 8/2013 | Reams, III | .......... | H04L 63/1416 709/225 |
| 9,088,509 B1* | 7/2015 | Sella | ..................... | H04L 45/306 |
| 2002/0141343 A1* | 10/2002 | Bays | ................... | H04L 41/0893 370/235 |
| 2002/0186259 A1* | 12/2002 | Meandzija | .............. | H04L 12/18 715/853 |
| 2009/0288157 A1* | 11/2009 | Pacella | ............... | H04L 63/1441 726/12 |
| 2011/0122776 A1* | 5/2011 | Jacob | .................... | H04L 41/145 370/250 |
| 2011/0264822 A1* | 10/2011 | Ferguson | ................ | H04L 45/00 709/235 |
| 2011/0296053 A1* | 12/2011 | Medved | ............... | H04L 67/104 709/241 |

(Continued)

*Primary Examiner* — Rebecca E Song

(57) ABSTRACT

Embodiments are provided for managing routes of data traffic within a network. The management may be performed via a graphical user interface that interacts with a Web server to update a configuration file. The configuration file can be converted to router management commands by a network management device (e.g., a BGP speaker). The commands can then be sent to a border routers for controlling network traffic. Embodiments are also provided for capturing and logging routing updates made in a network.

16 Claims, 5 Drawing Sheets

(56) References Cited

U.S. PATENT DOCUMENTS

| | | | |
|---|---|---|---|
| 2012/0144066 A1* | 6/2012 | Medved | H04L 45/02 709/242 |
| 2013/0182710 A1* | 7/2013 | Scholl | H04L 45/02 370/392 |
| 2014/0372577 A1* | 12/2014 | Hui | H04L 41/0816 709/221 |
| 2015/0019991 A1* | 1/2015 | Kristjnsson | H04L 41/0853 715/747 |
| 2015/0281085 A1* | 10/2015 | Phaal | H04L 47/12 370/235 |

* cited by examiner

FIG. 3

MANAGING TRAFFIC CONTROL IN A NETWORK MITIGATING DDOS

RELATED APPLICATIONS

This non-provisional application claims the benefit of priority to co-pending U.S. Provisional Patent Application No. 62/067,356, filed Oct. 22, 2014, titled "MANAGING TRAFFIC CONTROL IN A NETWORK MITIGATING DDOS," (attorney docket no. 0547-US-P1), the entire contents of which are fully incorporated by reference herein for all purposes.

BACKGROUND

In a distributed network like the Internet, different computers and computer networks may be virtually connected and accessible via various routes. When a computer or computer network is under attack, e.g., a distributed denial of service (DDoS) attack, responses to the attack must be made in order to maintain the network's accessibility to other networks and computers. A team of network administrators can manually login to a router to change routing rules in response to the attack to maintain proper network operation.

But such a solution has some undesirable properties. This method does not scale, lacks efficiency, and provides little context to business managers who may want to know the who, what, when, why, and how of a change in the network. Further, managing multiple border routers using a fragmented team of network administrators creates problems. Often, junior network administrators do not have proper certifications and are not qualified to make network changes, putting the network at risk. Also, there is little historical data that can be captured. This makes it difficult to manage route injection over time.

Embodiments of the invention address these and other problems, individually and collectively.

BRIEF SUMMARY

Embodiments are provided for managing routes of data traffic within a network. The management may be performed via a graphical user interface that interacts with a Web server to update a configuration file. The configuration file can be converted to router management commands by a network management device (e.g., a BGP speaker). The commands can then be sent to a border routers for controlling network traffic.

Embodiments can allow for more automated and timely responses to provide needed routing changes, including changes in response to DDOS and other network attacks. Embodiments can provide a central point to control routing and prevent unqualified people from having access to network control, as well as logging all routing changes made. Embodiments are also provided for capturing and logging routing updates made in a network.

Other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 3 shows a system GUI for managing routes.

DETAILED DESCRIPTION

When managing the routing for a computer network, networking administrators often have to manually update the routing. This can be a complicated job, especially when a network is under a DDOS or other attack. Embodiments are described for managing routing for network addresses in an efficient and controlled manner and logging changes to routing, including graphical user interfaces.

I. BGP and Routing

The Internet is a collection of connected autonomous systems, the systems under the control of one or more network operators. On the Internet, an autonomous system is a collection of connected IP routing prefixes that presents a common, clearly defined routing policy to the Internet. In a distributed network like the Internet, different computers and computer networks may be virtually connected and accessible via various routes.

Figure 1:
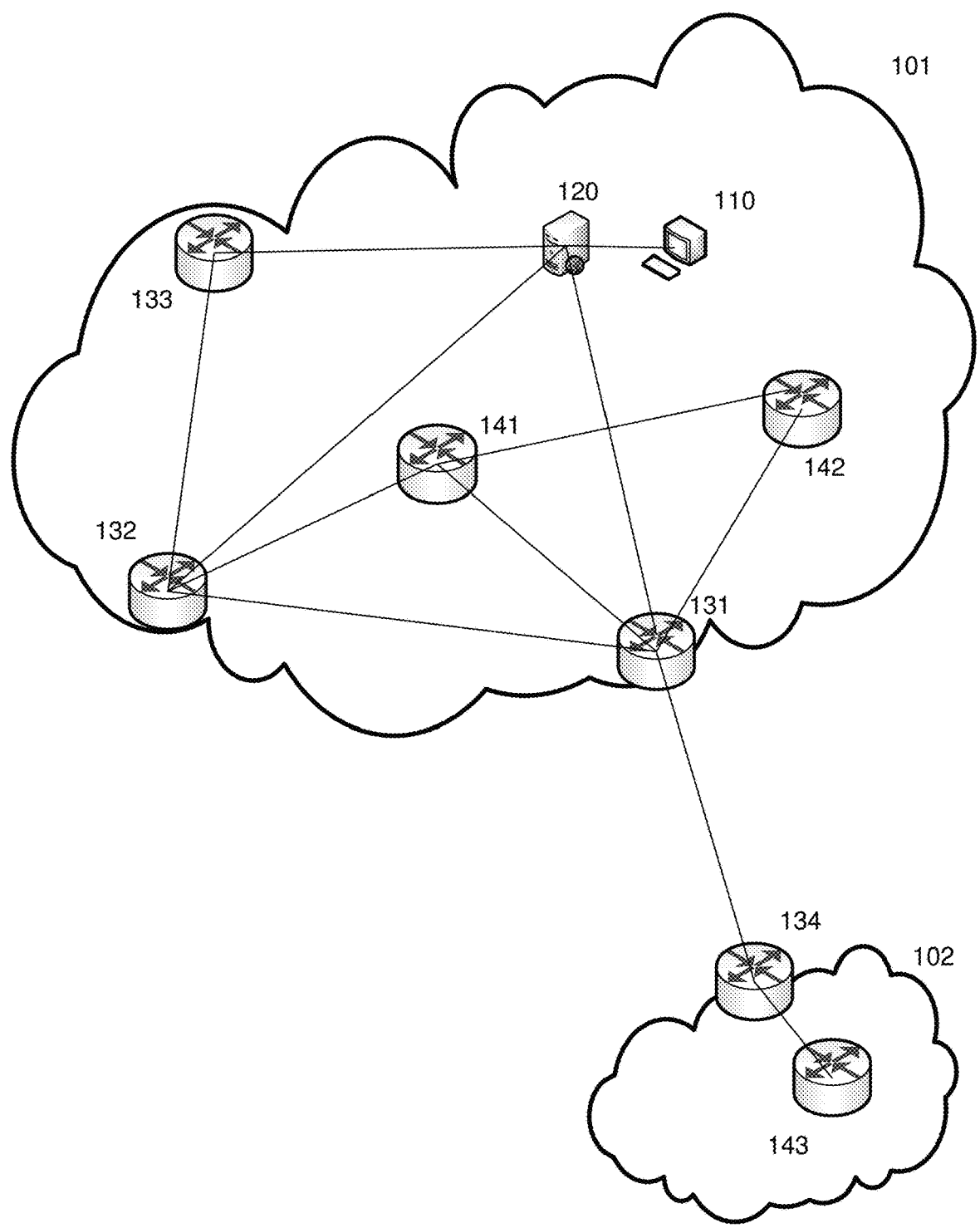
FIG. 1 is system diagram showing autonomous systems, border routers, a web server and a terminal.

FIG. 1 is a system diagram showing two autonomous systems 101 and 102. Autonomous system 101 contains routers 131, 132, 133, 141, and 142. Routers 131, 132, and 133 are border routers. Terminal 110 is used by system administrators to send routing commands via webserver 120 to the border routers. Autonomous system 102 has routers 134, and 143. Border routers 131 and 134 are used to connect autonomous systems 101 and 102.

The way that the systems are connected to each other comprises the routing of the Internet. The Border Gateway Protocol (BGP) is a standardized exterior gateway protocol designed to exchange routing and reachability information between the autonomous systems on the Internet, allowing the creation of a loop-free routing topology among autonomous systems. BGP can also be used for routing within an autonomous system. Once peer machines have been configured to exchange routing information, they will form a TCP connection and can begin communicating in BGP.

As defined in at least RFCs 1771, 1997, and 4271, BGP communities are a group of destinations that share some common property. Each autonomous system administrator may define which communities a destination belongs to. By default, all destinations belong to the general Internet community. They are attribute tags that can be applied to incoming or outgoing prefixes to achieve some common goal, for example, which routing information a system accepts, prefers or distributes to other neighbors.

The community attribute allows for grouping of communities, to which common routing decisions, for example, acceptance, preference, and redistribution can be applied. Community Strings are applied by routers according to rules expressed in the router's configuration. These are commonly known as routing policies. Several common, predefined community attributes are: "no-export," which causes the route to not be advertised to external peers, "no-advertise," which cause the route to not be advertised to any peer, and "internet," which causes the route to be advertised to the entire Internet community.

Unlike with other protocols, BGP does not broadcast its entire routing table. Instead only upon startup, peers will hand over their entire routing table. After that time, update messages are used to change routing. Route updates are applied to the Routing Information Base (RIB), which can contain multiple paths to a destination. Each router must decide which of these routes will make it into the routing table, and thus, which paths will be used. If a route is withdrawn, another route to the same destination can be taken from the RIB, if available.

As well as using attributes, BGP uses classless interdomain routing (CIDR) to reduce the size of the routing tables. CIDR is a process for exchanging routing information of prefixes and prefix lengths without regard to address classes (e.g., 192.168.2.0/24 for IPv4 addresses, and 2001: db8::/32 for IPv6 addresses).

Certain routers in each autonomous system can be designated as those that will run the protocol and exchange routing information. These routers, called BGP speakers, advertise BGP messages, and exchange new routing information with other BGP speakers. BGP speakers can determine a path to reach a particular destination while detecting and avoiding paths with routing loops. The routing information can include the route prefix for a destination, the path of autonomous systems to the destination, and additional path attributes.

II. System for Managing Network Routing

Traditionally, the software running on a router is managed manually (e.g., by logging in to a router) to maintain a properly functioning network to allow it to receive instructions about how to route, and also to then broadcast those routes to the rest of the Internet. Certified network administrators can change the routes and know how to change them, or at least adhere to a set of guidelines. However, there are often not necessarily enough qualified people to make the necessary changes. One possible solution is to restrict access to junior network administrators in such a manner that they are only allowed to do very specific functions, but such a restriction can cause responses to attacks to be delayed. The manual management of null routes can be overwhelming. An administrator has to take the time to log into a router and then check the keys and then commit the change. That could take quite a bit of time. The greater the number of routes, greatly increases the time that is required to manually manage them.

Figure 2:
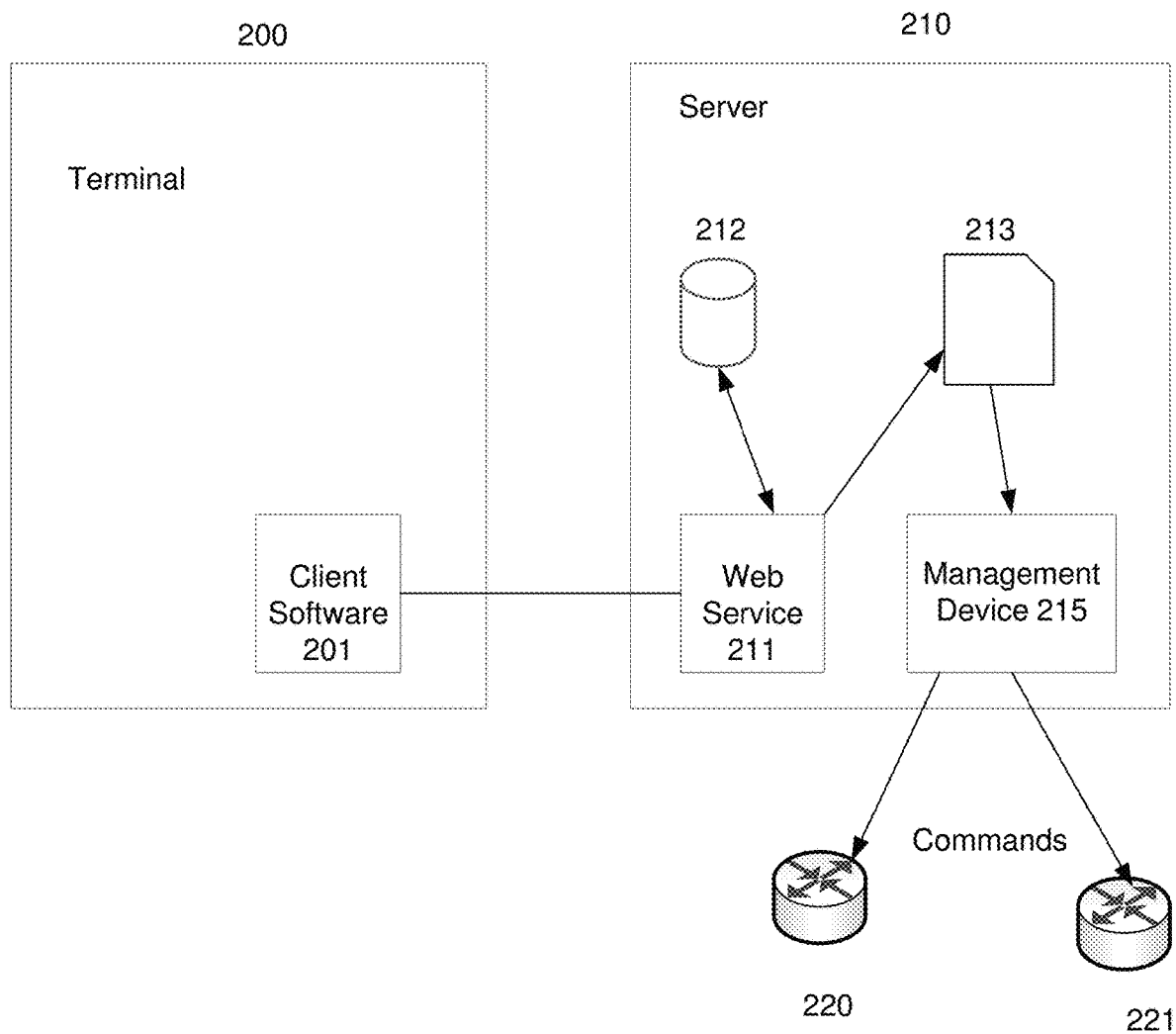
FIG. 2. is a system diagram showing a terminal and server for managing routes.

FIG. 2 is a system diagram showing management of border routers. Terminal 200 has client software 201 to provide information to Web Service 211. The client software 201 can be provided to terminal 200 by Web Service 211 (e.g., via a Web browser) or can be a standalone application that communicates to Web Service 211. As shown, server 210 hosts a web service 211 that client software 201 on terminal 200 connects to. Server 210 also has a database 212 to log a history of all routing changes made. A user can specify update information via client software 211, and this update information can be used to update a configuration file 213. Server 210 can maintain configuration file 213 such that it is rebuilt when changes are made. A management device 215 can read configuration file 213 and convert the information to router management commands, which are sent to border routers 220 and 221. In one embodiment, management device 215 can run BGP and act as a BGP speaker by sending out BGP commands. In various embodiments, management device 215 can be within server 210 or be separate from server 210. Border routers 220 and 221 can also act as BGP speakers. The client software can include a GUI, which provides an interface for modification of routes.

A BGP null route can be used by the system to tell upstream carriers to discard the traffic if they receive traffic for a particular destination address. Null routes can be used for a variety of purposes. A null route can be used, for example, in the event that a network device is receiving more traffic than it can handle for a particular destination address or it is receiving more traffic than a customer has subscribed to for a particular destination address. Another example use of a null route is when maintenance is being performed on a network device.

An automatic system for management of, for example, several hundred or more routes, including null routes, is desired. Such a system simplifies the process because actions applied to many routes can be performed in a couple of seconds, versus having to take the time to log into a router and then check the keys and then commit the change, which could take quite a bit of time. This automates part of the management by streamlining it so it is easier for someone to do less amount of steps.

An automated system can also allow for additional capturing of log data. If an administrator is manually entering commands, an automated audit trail of what took place, what keys were struck and so on is not automatically generated. There is historical data that could be captured to allow administrators to manage route injection over time.

The system can act as a central point to control the routers, and the BGP speakers. It is a central point where all control of all of the border routers is done through. BGP speakers can use community information to control the routing information distributes to other neighboring border devices. Network administrators could navigate there, and instead of logging into each router, commands, like a null route, could be propagated out to a carrier, then the carrier will hold that null route no matter where it is coming from globally. Only one router might be needed in order to handle null routes.

Whoever is logged into this system software might be able to control multiple routers through a single interface. In some embodiments, there can be multiple people at the same time, possibly running the software. If network administrators are going to change any routing, it can be done through that single user interface.

When the routing system is automated, if multiple attacks occur, it may not be as overwhelming to administrators who can apply changes more quickly to potentially larger amounts of routers simultaneously. Consequently, if network administrators have to spend less time adjusting routes, then they could come up with more optimal routing, and have to use less null routing in the process to optimize the network. Keys for a route change for multiple routers can be distributed to just one interface in a few seconds, versus having one key per router.

This can simplify the usage of null routing. If there are multiple attacks be handled manually, it can be hard to get to all of them, the need will still arise to null route something in the meantime. However, with a centralized system, the needed null routing will be simplified.

There are times that ideally null routes might not necessarily be desired. A network administrator may do something a bit more finely tuned to a particular task or a particular request. There are a lot of things that would need to be to done to make that fine-tuned coordination, which would take a considerable amount of time in a manually configured network. In a manually configured network, that might lead the administrators to actually do a null route, because that is the only thing that they can do in that quick of a time frame. With a centrally managed system there is now the ability to maybe provide the fine-tuned routing or other changes, administrators might be able to do that in the amount of time that is needed. Therefore, administrators would not need put in a null route.

III. User Interface

The graphical user interface (GUI) interacts with a web service, as the system is web-based. The GUI takes the input selections from the user and then translates the inputs into the proper BGP commands also known as router management commands. The GUI backend stores the addresses and the requested action in a database. Every time there is a change, the system rebuilds the configuration file and pushes it out to the BGP speakers and then tells the BGP speakers to reload themselves, which is how the configuration files are used.

The GUI allows a non-expert to reconfigure BGP and do route injection, without being tied to vendor hardware or needing a network engineer to log into the router. It allows non-technical people to add, remove, and manipulate routes in a network.

On the GUI, there is the option of adding a new address or a range of addresses into the system. Administrators can force filtering so that the traffic has to go to a scrubbing center, or they can enforce no filtering so that if the system starts filtering too much traffic, it can be stopped. What this provides is actually like a manual override for overriding filtering. The GUI also allows for removing addresses from the system as well, so administrators no longer need to have this manual process for route removal and can just remove an undesired route.

FIG. 3 is a sample of a system GUI. The GUI includes a blank text box, a search pull down menu (e.g., to selection actions), and a button labeled Go. The available action in the menu can be limited to those actions that allowed, thereby removing the danger of someone making a routing error that might be entered if someone was logged into a router.

Listed below the blank text box is a list of IP addresses, time applied, which is the time that a change was made in routing to the IP each address, and status. The status is indicative of the type of change made. For example, the type of change could be null routed, or diverted to ADS, meaning diverted to a DDOS system. The search pull down gives options to be applied to an IP address or range of addresses input in the blank text box. The range of IP addresses can be input in CIDR notation. The options the user can choose from in the search pull down menu include search, null route, divert to ADS or do not divert. Search means that if the IP address is entered, it will search and give what the current status for that particular address or range of addresses is. A user can also input a range of addresses in CIDR notation and apply a same update to that whole range, as opposed to address by address. That update is passed on to all routers that are connected to. In one embodiment, a comment field can be provided, and sorting options for the status type can be provided.

Also in the GUI are 3 links, [comment], [edit], and [delete]. Clicking on the [comment] enables commenting associated with the particular address. The [edit] for each address or group of addresses is to edit the address or group of addresses in the search box. The [delete] is for deletion. So administrators can delete address or group of addresses out of the system. When the address or addresses are deleted, it means that the system is no longer managing them. The status is deleted out of the configuration file as well. At that point, when it gets pushed out, when a new configuration file information gets pushed out to the border routers, they do not have any information for it, so therefore they do not do anything special to it. It just goes through as any other destination that it has no rules for.

IV. Method for Managing Network Routing

The backend of the system will implement the changes specified in the GUI. If there is a change in routing desired, the backend rebuilds the configuration file and pushes out the changes to the BGP speakers and then tells the BGP speakers to reload themselves based on the changes specified in the GUI. Rebuilding the configuration file involves converting the contents of the configuration file into BGP routing commands. The system increases the configuration from the speaker when pushing data out to the speaker. The speaker then that tells the speaker to reload itself. There is a schedule screen in front of them that is also web-based. The actions behind it will send out the configuration files to the routers.

Figure 4:
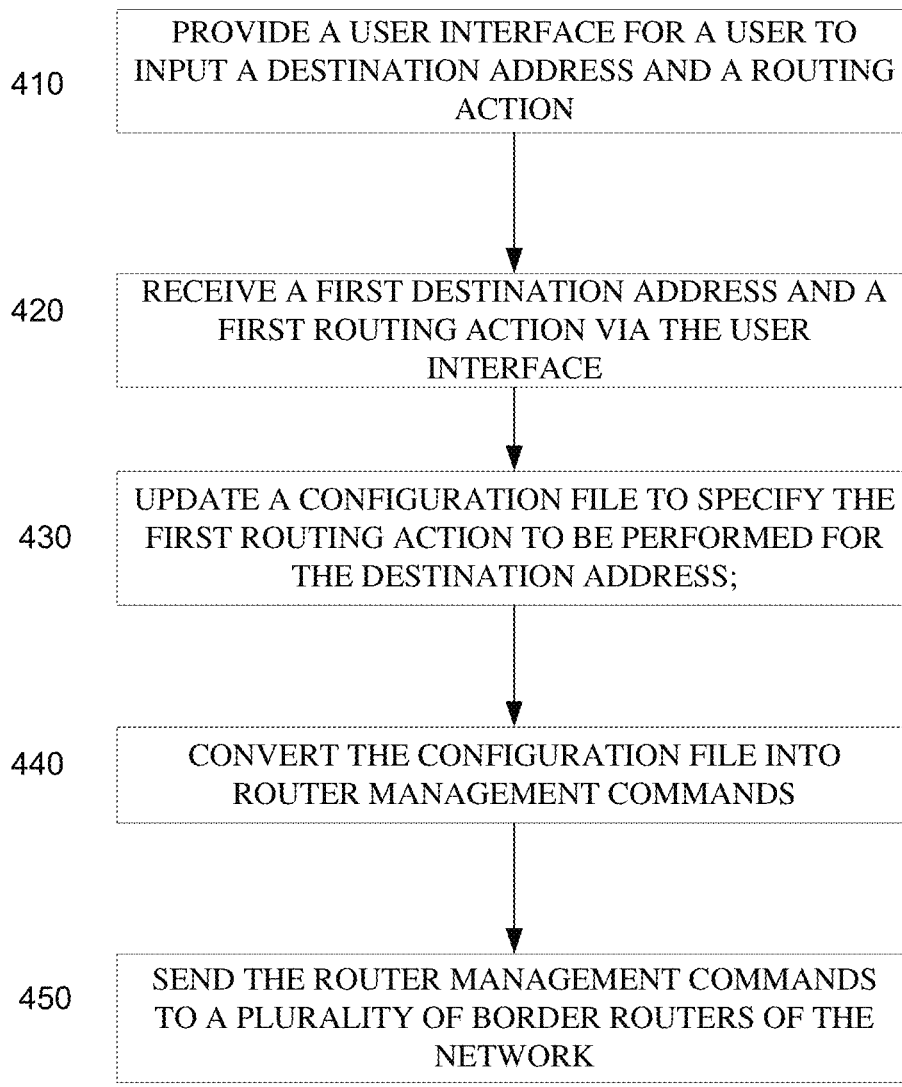
FIG. 4 is a flowchart describing inputting routing commands into a user interface and propagating the commands to the appropriate border routers of a computer network.

FIG. 4 is a flowchart of a method 400 for managing routes of data traffic within a network. Method 400 may be performed by a GUI, for example, the GUI as shown in FIG. 3.

At block 410, a user interface is provided for a user to input a destination address and a routing action. The destination address can be entered in CIDR format, and the routing action can include, for example, searching for the status of the address, null route to address, divert traffic bound for the address to an ADS, or not diverting traffic bound for the address.

At block 420, a first destination address and first routing action are received to the system via the GUI. For example, a user can specify the first destination address into the search box and select a routing action from a menu (e.g., a dropdown menu).

At block 430, a configuration file is updated to specify the first routing action to be performed for the destination address. For example, the destination address and desired routing action that were input in the GUI can be updated in a configuration file in the configuration file's format.

At block 440, the updated configuration file is converted to router management commands. The configuration file is read, and the appropriate router management commands are generated. These commands can be read and understood by the routers they are sent to. In one embodiment, the commands can be BGP commands.

At block 450, the router management commands are sent to a plurality of border routers of a network or autonomous system. For example, the commands can be sent to border routers 220 and 221.

When the system sends out a configuration file to border routers, the border routers in turn can then act as BGP speakers if they need to broadcast anything else out to other parts of the Internet. On the backend of the system, the configuration file is updated. The configuration files can be converted from the existing format to commands (e.g., BGP commands) that a router can understand. The speaker then broadcasts this information to a specified set of routers.

The GUI can be web-based, and allows administrators to enter information. The information comes to the web server. From the web server, commands are sent on to the border routers (e.g., via the BGP speaker), which can be on the web server or architecturally separated. The GUI can allow administrators to specify an address, or a range of addresses, and then specify a status to be implemented. The GUI backend can receive the commands. If a command would not change the routing already in place, the system can identify it and just not do anything. For example, if for an address, if the system was to null route and address while it is already null routed, the system would compare that figure to the current configuration and see that it is already set to the same setting, and not do anything.

Once an operator makes a change on the GUI, the configuration file is updated. This update can triggers the software that causes management device/module (e.g., a BGP speaker) to convert that configuration file to router commands, and then sends those commands out through the connected routers.

The GUI can include timers and correlate the route injections. For example, if someone injects a route, e.g. null route, the system could allow administrators to see how long ago it happened, what ticket (an ID number associated with the injection) it was related to, and put a note or comment next to the event. Thus, the GUI and server can take aspects of event management and connect them to route management.

In various embodiments, timers can be used to expire a routing action, or a timer that activates a route. Administrators can set a timer, but the changes are not actually made right away. For example, a user can set a timer for the route to trigger at a particular time. Timers can be used to set a future time for which a routing action is to be used. The system can also wait until a future time to update the configuration file using timers.

In some embodiments, each record in the configuration file can correspond to a route that is injected. The record can also include metadata that is useful to the business, e.g., when it happened, why it happened, who did it, who they did it for, how many times it happened. All those things can be tracked. A database (e.g., 212) can keep track of the changes. It provides context for the business. Such context does not exist when a network administrator logs into a router and makes a change, particularly not a context across routers.

When a network administrator changes routes, adding and removing, the system can track the statistics and can see what systems need what resources more often. Administrators can get observed data that would normally not have been available if administrators were only manually entering changes into a router, unless the administrators parsed through all of the logs. But, even then administrators would be missing data, like who placed the route. And logs in the route do not track how long routes were in place for. This system can fill that gap in the data. Embodiments can include everything that is done to the network. If injecting a route, administrators can add a business context, like a note or alert. It gives context and insight to network changes.

V. Computer System

Figure 5:
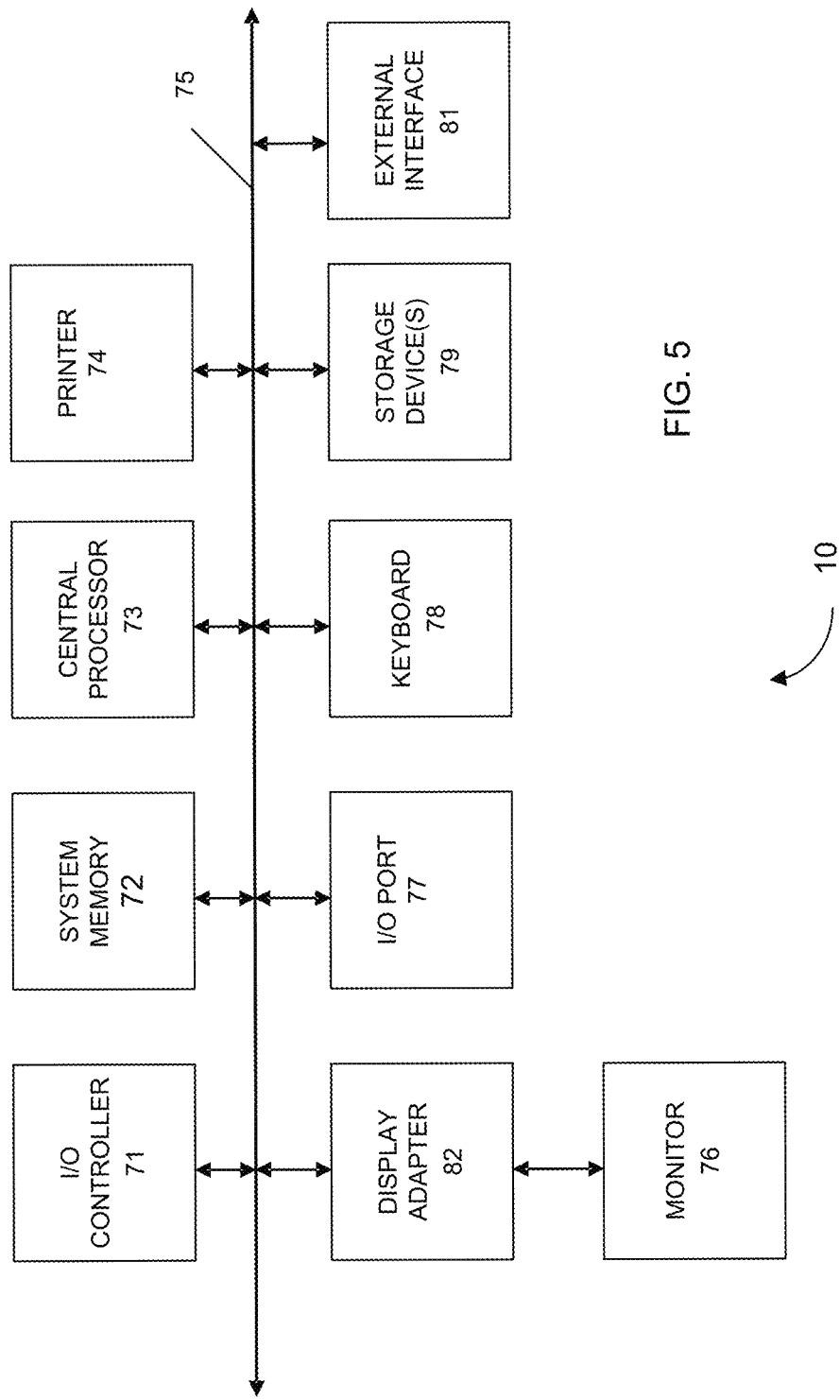
FIG. 5 shows a block diagram of an example computer system usable with system and methods according to embodiments of the present invention.

Any of the computer systems mentioned herein may utilize any suitable number of subsystems. Examples of such subsystems are shown in FIG. 5 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of managing routes of data traffic within a network, the method comprising performing, by a computer system:
   providing a user interface for a user to input a destination address and a routing action, wherein the user interface provides a plurality of routing actions from which to select, wherein the plurality of routing actions includes a discarding routing action to be performed at the plurality of border routers, a null routing action separate from the discarding routing action, and a diversion routing action that specifies a computing device within the network that is not a destination address where the computing device filters network traffic to mitigate denial of service attacks on the destination address based on rules;
   receiving a first destination address and a first routing action via the user interface;
   receiving, via the user interface, a future time for which the first routing action is to be used; and
   upon reaching the future time:
     updating a configuration file to specify the first routing action to be performed for the destination address;
     converting the configuration file into router management commands; and
     sending the router management commands to a plurality of border routers of the network.

2. The method of claim 1, wherein updating the configuration file includes adding the first destination address to the configuration file.

3. The method of claim 1, wherein updating the configuration file includes changing a previous routing action for the first destination address to be the first routing action.

4. The method of claim 1, wherein the computer system is a server.

5. The method of claim 4, wherein the router management commands are Border Gateway Protocol (BGP) commands, and wherein the server acts as BGP speaker.

6. The method of claim 1, wherein the user interface is provided by the server setting the user interface to a client device.

7. The method of claim 1, wherein the computer system includes a server in a transmitting device, wherein the transmitting device converts the configuration file and sends the router management command.

8. The method of claim 1, further comprising:
   forwarding one or more router management commands from the plurality of border routers to one or more other routers based on the first routing action.

9. The method of claim 1, wherein the first destination address specifies a range of addresses.

10. The method of claim 1, wherein the user interface displays a list of destination addresses and an associated routing action.

11. The method of claim 10, wherein the user interface provides selection objects for editing or deleting the destination address of list.

12. The method of claim 10, wherein the user interface provides selection object to add a border router to which the router management commands are sent.

13. The method of claim 10, wherein the user interface displays a time associated with each destination address on the list.

14. The method of claim 13, wherein the time corresponds to how long the current routing action has been performed for each destination address on the list.

15. The method of claim 1, further comprising:
   receiving a first source address corresponding to the first destination address, the first source address designated as a good address; and
   adding the first source address to the configuration file, wherein the router management commands specify that network traffic from the first source address is to be sent to the first destination address for any routing action.

16. The method of claim 1, further comprising:
   receiving, via the user interface, a future time for which the first routing action is to end and a previous routing action is to be used;
   identifying with future time is reached;
   subsequent to the identification, updating the configuration file to specify the previous routing action is be performed for the destination address;
   converting the configuration file into new router management commands;
   sending the new router management commands.

* * * * *